United States Patent [19]
Simon

[11] 3,874,031
[45] Apr. 1, 1975

[54] APPARATUS FOR THE MANUFACTURE OF ROLLS FROM BATTING

[75] Inventor: Stefan Simon, Mödling/Niederösterreich, Austria

[73] Assignee: Carl Hahn GmbH, Dusseldorf, Germany

[22] Filed: July 10, 1972

[21] Appl. No.: 270,393

[30] Foreign Application Priority Data
July 13, 1971 Germany............................ 2134921

[52] U.S. Cl. ............................................. 19/144.5
[51] Int. Cl.............................................. A61l 15/00
[58] Field of Search ................................... 19/144.5

[56] References Cited
UNITED STATES PATENTS

| | | | |
|---|---|---|---|
| 2,763,899 | 9/1956 | Niepmann et al. ................ | 19/144.5 |
| 2,977,644 | 4/1961 | Wieser........................... | 19/144.5 X |
| 3,477,102 | 11/1969 | Etz................................. | 19/144.5 |

Primary Examiner—Dorsey Newton
Attorney, Agent, or Firm—Jason Lipow

[57] ABSTRACT

An improvement in an apparatus of the automatic feed, separation and winding of a specific length of a fibrous batting for tampons or the like, comprising a rotatable winding fork which is axially displaceable transversely of the plane of transport of the delivered batting, a device for the separation of pieces of batting of specific length, a plurality of confronting, cam-controlled tool groups, each of which comprises a batting holding means comprising at least one, preferably two, cam-controlled clamping jaws for the pieces of batting, said tool group containing a separating means movable transversely of the transport direction of the batting holding means is in engagement with the batting, the improvement which comprises at least two endless flexible members drivable synchronously, stepwise in a common plane of circulation, one clockwise and the other counterclockwise, the winding mandrel being movable transversely of the plane of circulation into an interstice formed by working sections of the flexible members which working sections of the flexible members are disposed in parallel, spaced relationship and bear partially cooperating, each flexible member having at least one tool group which cooperates with a tool group on the other flexible member so that in faced relationship they divide a pair of tension jaws, a winding cup, a pair of clamping jaws and separating means movable transversely to the batting wherein the length of each tool group corresponds to the length of the piece of batting to be pulled off and wound.

11 Claims, 4 Drawing Figures

APPARATUS FOR THE MANUFACTURE OF ROLLS FROM BATTING

BACKGROUND OF THE INVENTION

1. Field of the Invention

The invention relates to an apparatus for the automatic feed, separation and rolling of strips of specific length of cotton batting for tampons or the like, with a rotatable winding fork that is axially displaceably transversely of the plane of transport of the delivered batting, a device for the separation of pieces of batting of specific length, a plurality of confronting, cam-controlled tool groups consisting each of a holdfast means with two cam-controlled clamping jaws for the pieces of batting and of a separating means which, when the holdfast means is closed, is movable transversely of the transport direction of the batting.

2. Discussion of the Prior Art

Apparatus of the above-described known type suffer, if they operate intermittently, from limitations of operating speed which are due to the masses which have to be reciprocated and which result in limited output. In the case of continuously operating apparatus, the cost involved in controls and the cost involved in machinery are considerable in relation to the number of pieces of batting per minute that is, as a rule, desired, and is possible on account of the limited delivery of the intermediate product, e.g., from a carding machine.

Increasing the output of an intermittently operating apparatus by increasing the rotatory speed and reducing the masses leads necessarily to a further shortening of the time necessary for the individual operating procedures and to premature wearing out of the material. Even if the wear could be accepted, nevertheless the loss of product quality due to inappropriate treatment - such as uncontrollable stretching of the batting as it is pulled in by grippers or the like, or quality defects due to backlash in winding - is no longer tolerable. Differences in stretching result in variations in the weight of the pieces of batting and consequently in pressing faults in the following process, which may run from excessively soft tampons which are unsuitable for insertion in use, to plastified tampons which can no longer expand. Too high a rotatory speed results not only in the scattering of fragments of batting but also in excessively tight rolls and hence in tampons with an excessively low absorption capacity.

It is the object of the invention to construct an apparatus of the kind described above in such a manner that the foreproduct, such as the sliver from the comb, can be worked under optimum conditions, while on the other hand it is to be possible to achieve a higher output than that of prior-art apparatus without requiring greater expense for this purpose, and without impairing reliability of operation.

SUMMARY OF THE INVENTION

Broadly, this invention contemplates an improvement in an apparatus for the automatic feed, separation and winding of a specific length of a fibrous batting, such as a cotton batting, for tampons or the like, comprising a rotatable winding fork which is axially displaceable transversely of the plane of transport of the delivered batting, means for separating pieces of batting of specific length, a plurality of confronting, cam-controlled tool groups, each of which comprises a batting holding means comprising at least one pair, preferably two pair of cam-controlled clamping jaws for the pieces of batting, said separating means being movable transversely of the transport direction of the batting when the batting holding means is in engagement with the batting, the improvement which comprises at least two endless flexible members drivable synchronously stepwise in a common plane of circulation, one clockwise and the other counterclockwise, the winding mandrel being movable transversely of the plane of circulation into an interstice formed by working sections of the flexible members which working sections of the flexible members are disposed in parallel, spaced relationship and bear at least partially cooperating tool groups wherein each of said flexible members comprises at least one tool group which cooperates with a tool group on the other flexible member when in facing relationship therewith to define a pair of tension jaws adaptable to engage said batting, at least one winding cup adaptable to receive a wound roll from said winding mandrel, at least one pair of batting clamping jaws adaptable to engage and hold said batting, said winding cup disposed between said tension jaws and said clamping jaws, the length of each tool group in the direction of circulation with respect to said flexible members corresponding to the length of the pieces of padding to be pulled off and wound.

At the heart of the present invention there is provided a pair of endless cooperating facing conveyor chains, each of which carries at least one facing member adaptable to engage in offset relationship a cooperating member on the facing conveyor chain so as to place batting therebetween under tension. Following said tension jaw, there is provided a winding cup on one of the surfaces of the conveyor chains, usually on the lowermost one. Thereafter, there is disposed at least one, preferably two, upper and lower clamping jaw members to clamp and engage the batting disposed therebetween. Located beneath the batting passing through the nip of the conveyor chains is a movable piece movable transversely to the direction of batting movement which serves to remove a piece of batting from the continuous batting and allow a winding mandrel to readily engage the same and deposit the same in the winding cup.

The present invention has as its basis an intermittent action wherein the conveyor chains are advanced, stopped to permit a winding action, and continue to deposit a wound roll toward the next working station while permitting, at about the same time, the commencement of a second operation on a second piece of cotton batting or the like. There is employed in the invention as seen from the ensuing disclosure, a pair of stepping wheels out of phase 180° from one another but responsive to the movement of a stepping cam common to both stepping wheels. One of the cams moves drive members of the conveyor chain while the other is in association with the winding mandrel to effect the winding action. The drive shaft of the winding cam can be provided with other means to effect a stripping function of the wound roll from the winding member, for instance. Additionally, means can be provided to transfer a wound roll from the conveyor chain transversely to the direction of transport such as onto a transfer device to take the formed roll to another working operation. By providing this intermittently operated apparatus wherein a plurality of functions can occur almost simultaneously at the conveyor chains, there is provided a substantially increased production of wound rolls and resultant tampons per unit time.

The invention achieves this object by the fact that two endless, flexible members are drivable synchronously stepwise in a common plane of circulation, one clockwise and the other counterclockwise, the winding mandrel being movable transversely of the plane of circulation into an interstice formed by the working sections of the flexible members which are disposed in parallel, spaced relationship, and which bear at least partially cooperating tool groups consisting of a pair of tension jaws, at least one winding cup, two pairs of clamping jaws and one separating arm pivotable transversely of the batting, the length of each tool group as viewed in the direction of circulation corresponding to that of the piece of batting that is to be pulled off.

This accomplishment is based on the replacement of great reciprocating strokes with exclusively forward-operating but intermittent movements. The time which is necessary for waste motion in the apparatus of the prior art, and which cannot be used for the working of the product, can thus be recovered for an approximate doubling of the actual working time. Furthermore, as a result of the special arrangement for individual movements, it is possible through superimposed timing to achieve an almost continuous process. For example, in parallel operation a considerable increase of output may be attained depending on the number of apparatus used. Furthermore, the apparatus in accordance with the invention assures a precise guidance of the batting until the roll has been made, and a precise guidance of the roll itself until it has been transferred to additional working stations. At the same time the assurance is obtained that the rolls will preserve their shape, so that the roll itself does not have to have an absolute stability of shape. Furthermore, the apparatus permits a spatial separation of the tools for the handling of the batting from the members serving to drive the apparatus, e.g., from the transmission, so that soiling is prevented and a most hygienic working of the batting is assured. The apparatus of the invention is moreover easy to maintain, since all important parts are easily accessible and easily replaceable. Easy adjustment of the tools is also possible in the same manner.

In further development of the invention, it is preferable to make the roll cups approximately semicircular and mount them laterally on the associated endless flexible member, while in the area of the cooperating sections thereof a spring-loaded guiding arm is articulated to the opposite endless flexible member and extends over the width of the batting. This measure contributes towards keeping the diameter of the rolls substantially constant.

It is desirable furthermore to articulate a curved arm on the roll cup which can be pivoted under cam control past the upper edge of the roll cup. This makes it possible to keep the finished roll precisely within the roll cup and carry it as desired without permitting the roll to change its shape during the transportation involved in the process.

In accordance with one embodiment of the apparatus, an ejection means in the form of a plunger displaceable transversely of the direction of advancement may be provided in the area of the ramp surface of a cam for controlling the above-mentioned curved lever. In this manner the roll may be transferred, for example, to another conveyor which carries it to the next working station.

Another desirable measure consists in offsetting from one another the associated tension jaws on the endless flexible members in such a manner that they bring about a deflection of the batting in the position in which they engage it. This offset arrangement of the tension jaws has the advantage that the batting is securely guided during the winding and at the same time undergoes a certain stretching which has an advantageous effect particularly on the one end of the piece that is pulled off, so that the piece will feather-edge into the cylindrical periphery of the roll.

Another means for the secure guidance of the batting during the winding procedure may consist in providing both the guide and the engagement surfaces of the tension jaws with edges laterally overlapping the batting.

For the intermittent driving of the apparatus, stepping wheels located opposite one another and offset 180° from one another may be provided, with planes of rotation parallel to one another, which are to be actuated by a drivable stepping cam (3) which is disposed between them and whose plane of rotation is perpendicular to those of the stepping wheels. It is desirable in that case that the stepping cam be in engagement with rollers mounted on the stepping wheels, through which the stepping wheels are alternately rotatable. In that case it is expedient that the one stepping wheel be coupled with the drive sprockets of the conveyor chains through a gear drive, and that the other stepping wheel be coupled to the winding mandrel through a countershaft transmission. The stepping cam may be co-rotationally mounted on a drive shaft disposed parallel to the direction of advancement of the batting, on which drive shaft additional control cams are disposed, by which the winding mandrel, the stripper and the ejection plunger may be moved back and forth transversely of the batting by means of a crank drive in each case. It is thus possible to construct the driving mechanism for the apparatus compactly and completely separate from the tools engaging the cotton batting.

BRIEF DESCRIPTION OF DRAWINGS

An example of the embodiment of the invention is represented in the drawing.

DESCRIPTION OF SPECIFIC EMBODIMENTS

Figure 1:
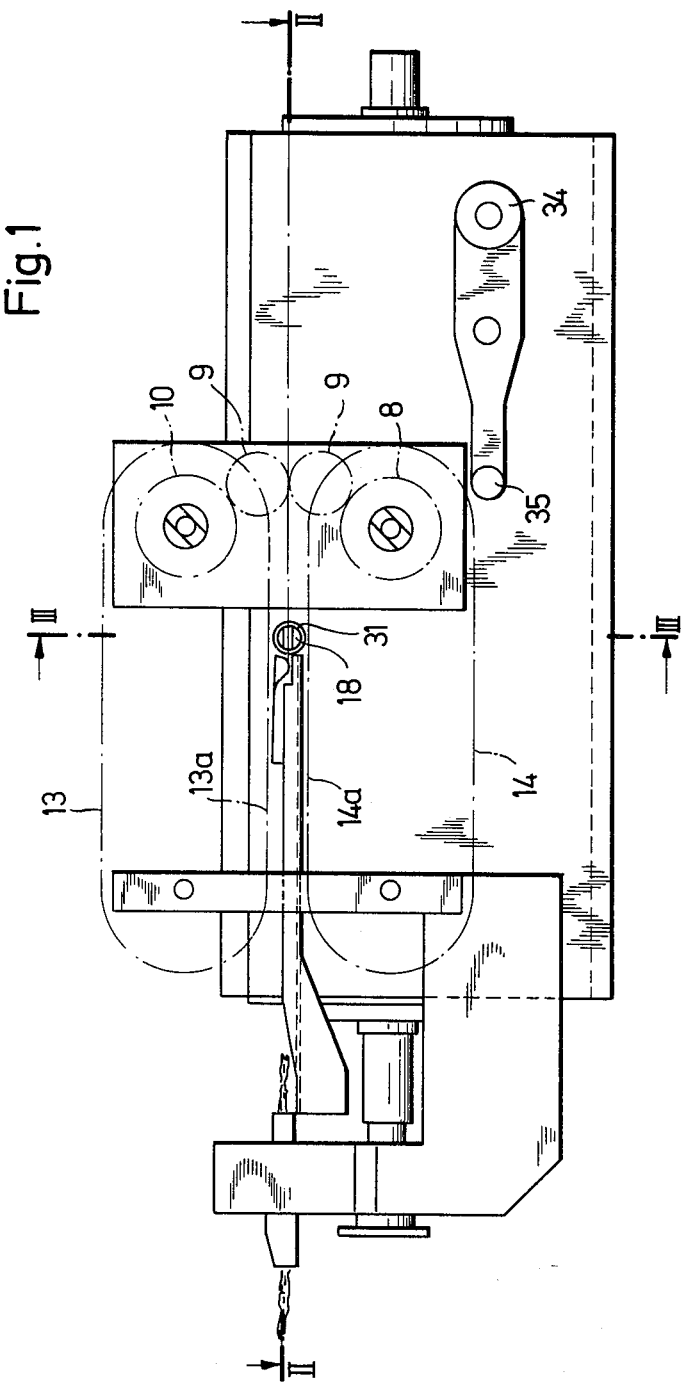
FIG. 1 shows an apparatus in accordance with the invention in a diagrammatic side elevational view.
Figure 2:
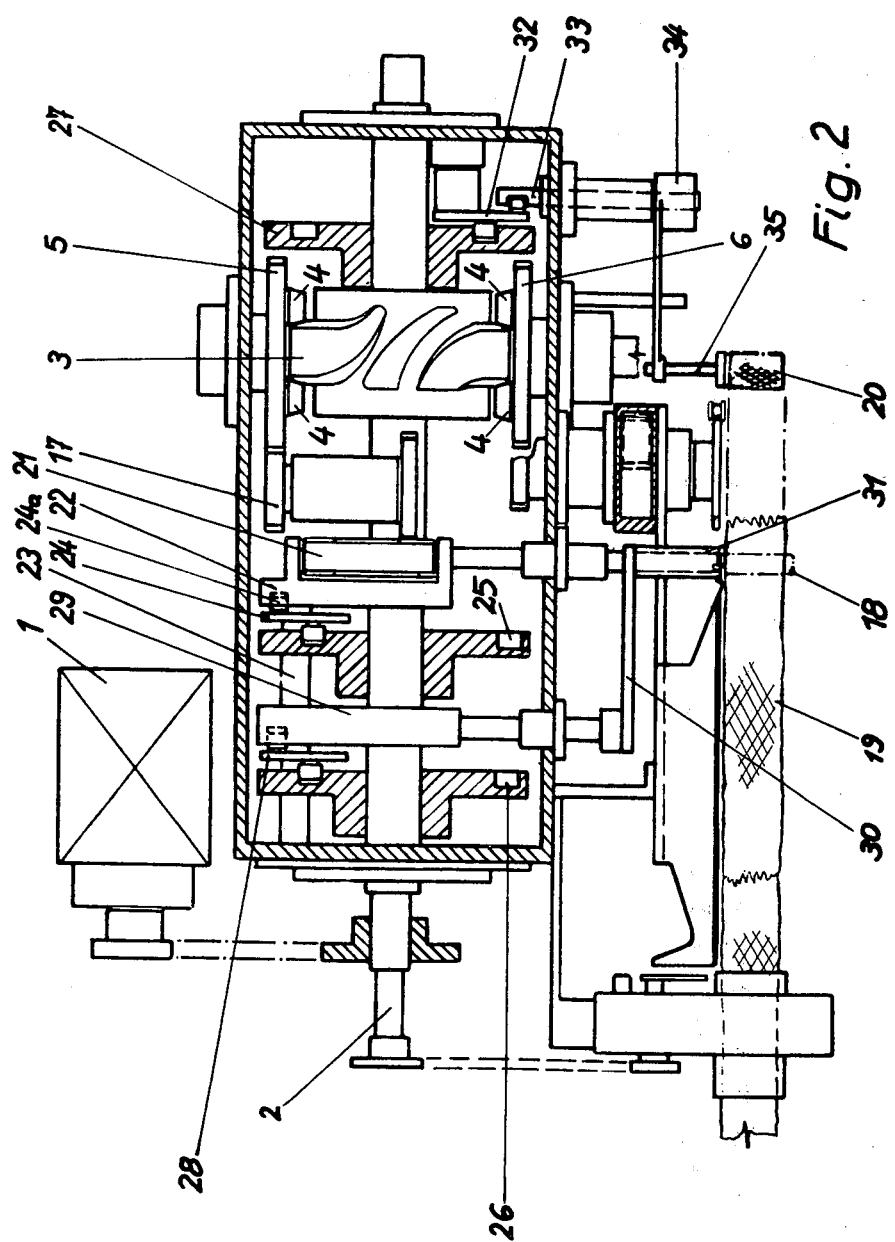
FIG. 2 is a horizontal cross section taken along line II—II in FIG. 1.

In FIG. 2 is shown a drive motor 1 which drives a shaft 2. A cam 3 co-rotationally mounted on shaft 2 (FIGS. 2 and 3) is in engagement with tapered rollers 4 which are mounted on the stepping wheels 5 and 6. These stepping wheels, whose planes of rotation are parallel to one another and perpendicular to those of cam 3 are offset from one another by 180°. The stepping wheels are in engagement through the tapered rollers 4 with the cam 3 in such a manner that, upon their rotation, at one time stepping wheel 5 can be rotated, and next time stepping wheel 6 can be rotated, while the other stepping wheel stands still.

The stepping wheel 6 is coupled through gears 7, 8, 9 and 10 (FIG. 3) with two sprocket wheels 11, 12 (FIG. 4) which intermittently drive two endless conveyor chains 13, 14, having confronting sections 13a and 14a. These conveyor chains circulate in the same plane, being guided over loose sprocket wheels 15, 16.

Figure 3:
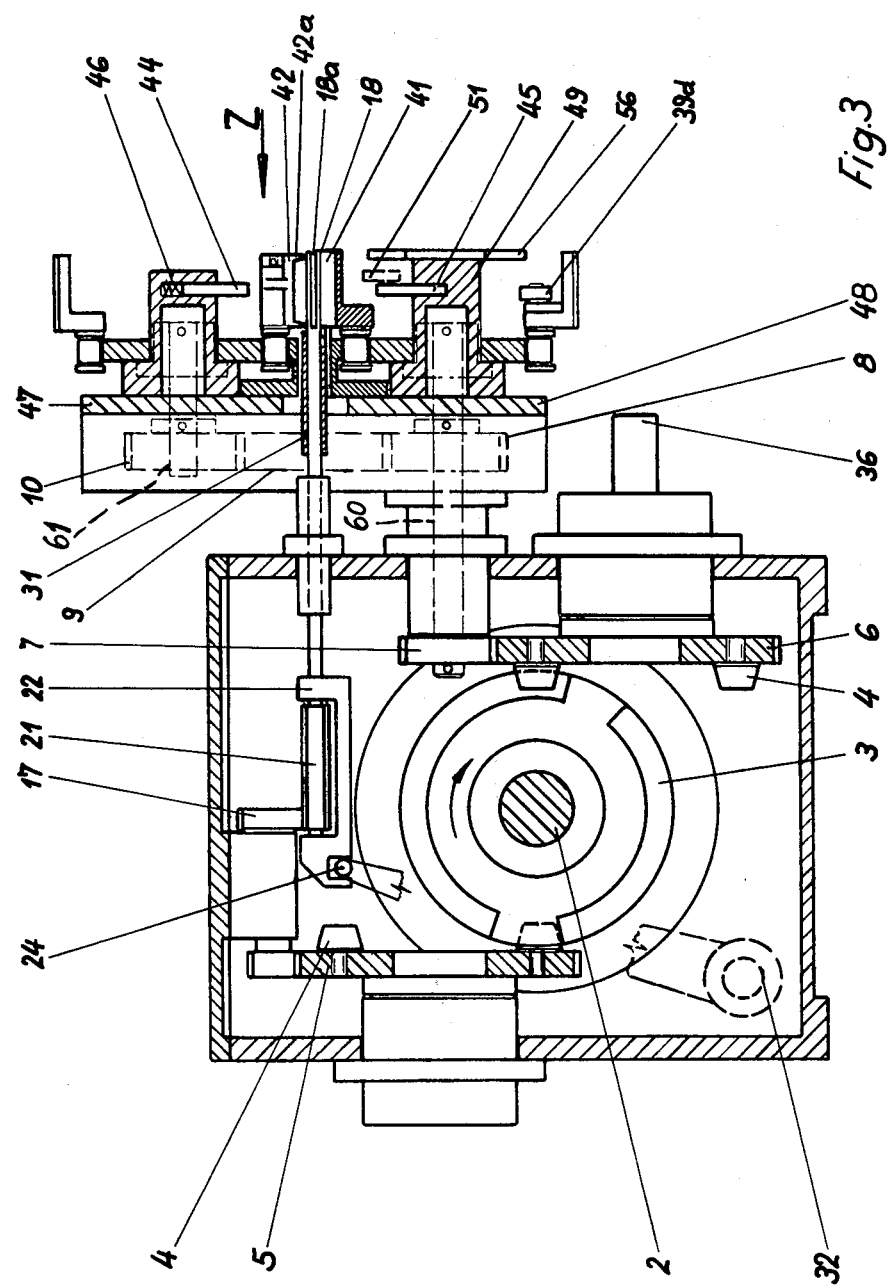
FIG. 3 is a cross section taken along line III—III in FIG. 1.

FIG. 3 shows the power transmitting elements for the power drive of the sprocket wheels for the upper and lower chains. The stepping wheel 6 on the shaft 36 drives the gear 7 which is mounted on shaft 60. At the other end of this shaft 60, the sprocketed wheel 12 is mounted for the lower chain 14. The power drive for the upper chain 13 is transmitted through gears 8, 9 and 10. The gear 10 is mounted on a shaft 61 which carries at its other end, the sprocket wheel 11 for the upper chain 13.

Stepping wheel 5, however, is connected through a transmission gear 17 (FIGS. 2 and 3) to a rotatably mounted winding mandrel 18 which is forked at its front end to engage a band of batting 19 at 18a. By means of the cam 3, the stepping wheel 5 and the transmission gear 17 the winding mandrel 18 intermittently performs, in the advanced position represented in FIG. 3, a certain number of half revolutions or whole revolutions depending on the size of the roll and the number of teeth in the transmission gear, such that the fork slot 18a is always horizontal when the winding mandrel is in its end position at the beginning and the end of its winding movement.

The winding mandrel 18 is mounted for displacement transversely to the direction of movement of the batting 19 in order to catch and release same. To this end a pinion 21 on the winding mandrel is given a corresponding length. This pinion is mounted in a yoke 22 which is in engagement with the one end of a crank lever 24 pivotally mounted on a shaft 23 (FIGS. 2 and 3). A roller 24a provided on the crank lever is guided by a cam 25 which is disposed co-rotationally on the drive shaft 2 such that, during the rotation of this cam, the crank lever 24 will perform a pivoting movement thereby pushing the winding mandrel 18 back and forth by means of the yoke 22. The arrangement is such that, in the advanced position, the winding mandrel 18 will perform a certain number of revolutions, while the rotational members connected to the stepping wheel, and hence also the conveyor chains, will stand still. When the rotation of the winding mandrel is stopped, the latter will be retracted by the crank lever 24, whereupon the stepping wheel 6 will be rotated.

Two additional cams 26 and 27 are disposed corotationally on the drive shaft 2. Cam 26 is connected through a crank lever 28 which is likewise pivotally mounted on shaft 23 to a rod-like transmission member 29 on which there is mounted a lever 30 with a stripper 31 surrounding the winding mandrel. Upon the retraction of the winding mandrel 18, the finished roll 20 is restrained by this stripper 31 and the pulling of fluff by the winding mandrel is prevented. The roll is then advanced to an ejection position or to a transfer position. In order that the transportion path may be entirely open during this advancing movement, the stripper 31 is slightly retracted by the cam 26.

As soon as the wound roll 20 has reached the transfer station (FIGS. 2 and 4), the conveyor chains 13, 14, are halted by the stepping cam 3 and the stepping wheel 6, whereupon the winding mandrel 18 is advanced. At this moment, at the transfer station, through the control cam 27, crank lever 32, a displaceably mounted rod 33 in engagement therewith, and a lever 34, a plunger 35 is pushed across the direction of conveyor movement and transfers the roll 20 to an additional conveyor means. This conveyor means for the ejected rolls, which is not shown, and which may be, for example, a cup conveyor chain, is driven intermittently through a shaft 36, which is driven by the stepping wheel 6 (FIG. 3).

In the apparatus of the present invention there are employed tool groups or processing groups, each of which groups comprises a pair of tension jaws 37a-37b, suitably three pairs of clamping jaws 38a-38b, 39a-39b and 40a-40b, although only one pair of clamping jaws need be employed. A winding cup 41 carried on the chain 14 is also present in the tool groups. The tool groups can also comprise a parting arm 50 more fully described below and cam means and cam followers whereby parting arm 50 is actuated. The tool groups are carried on the conveyor chains described. In the position represented in FIG. 4, in which the roll 20 is at the transfer station with the conveyor chains stopped, and the winding mandrel 18 is just beginning the winding process, there are provided on the sections 13a and 14a of the conveyor chains, from left to right, a pair of tension jaws 37a-37b, three pairs of clamping jaws 38a-38b, 39a-39b and 40a-40b, and these followed by a winding cup 41 on the chain 14 which is adjoined by a guide 42 disposed above it on chain 13. The winding cup 41 is again followed by a pair of tension jaws 37a, 37b.

Figure 4:
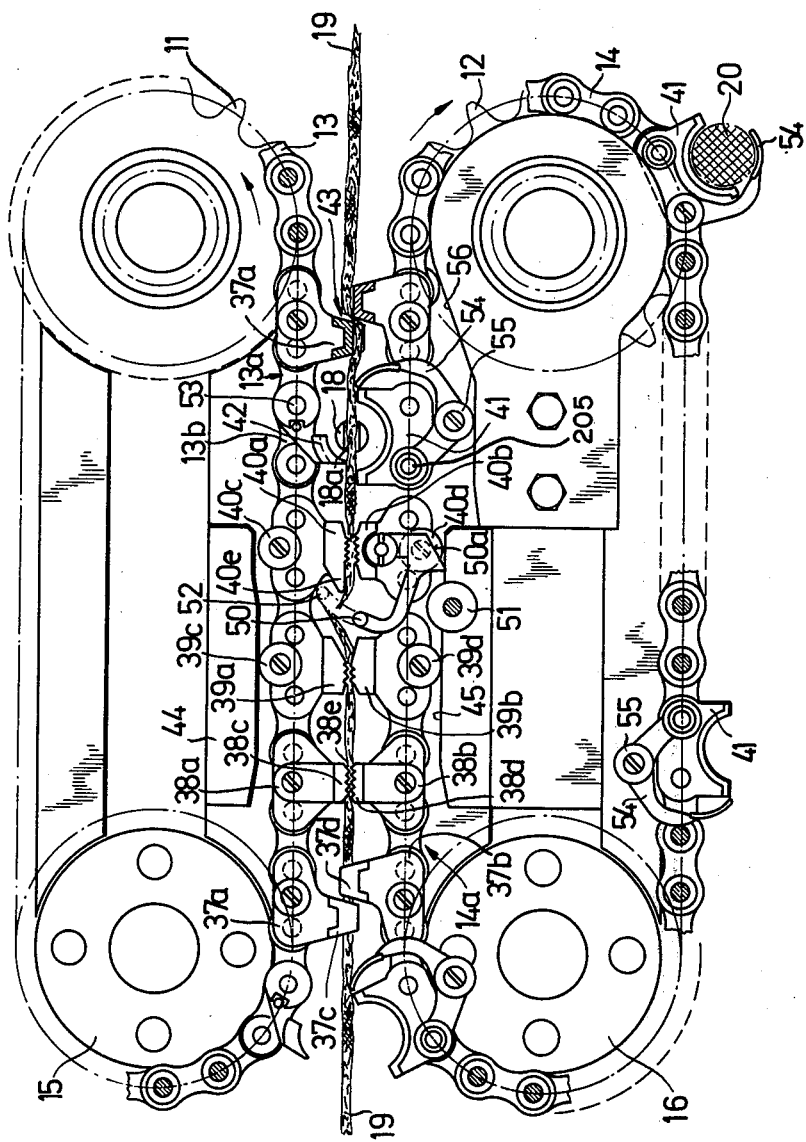
FIG. 4 shows the apparatus as viewed from the side in the direction of the arrow Z in FIG. 3.

The associated tension jaws 37a, 37b, are offset from one another so that the band of batting 19 is slightly deflected when these jaws are in the engaged position, as shown in detail at 43 in the case of the pair of tension jaws on the right side in FIG. 4. These tension jaws are provided on both sides with raised edges 37c, 37d, which serve for the precise guidance of the batting. The pair of clamping jaws 38a, 38b, however, consists of members whose engagement surfaces 38c, 38d, confront one another and are provided with teeth or grooves 38e. The clamping jaws of the two following pairs 39a-39b, 40a-40b, are provided each with a roller 39c-39d, 40c-40d, which, in the area where the piece of batting is to be parted from the rest, encounter guiding rails 44-45, so that the jaws of these two pairs are pressed more tightly together in this area of the apparatus in order to grip the batting more tightly. The upper guide rail 44, as shown in FIG. 3, is resiliently held against a spring 46 in a mounting which is fastened to one wall 47 of the structure. In like manner, the lower guide rail 45 is supported in a mounting 49 fastened to a wall 48 of the housing.

On the clamping jaw 40b there is additionally articulated a parting arm 50 whose relatively dull engagement section extends over the width of the band of batting 19. On this parting arm there is provided an inclined surface 50a which, during the forward movement of the conveyor chains 13-14, runs onto a roller 51 fastened to the lower guiding rail 45, causing the parting arm 50 to pivot transversely of the batting 19 into the position indicated at 52 by broken lines, in which the adjacent pairs of clamping jaws 39a-39b, 40a-40b, are pressed tightly together by the guiding rails 44-45. In this manner the fibers of the band of batting 19 are largely pulled apart by the parting arm 50. In the position shown in FIG. 4, this process has been completed, so that the rollers 40c-40d of clamping jaw pair 40a-40b have again been released by the guiding rails 44-45, so that the winding mandrel 18 can easily pull the torn-off piece of batting out of this pair of clamping jaws.

While the conveyor chains 13-14 are standing still, the winding mandrel 18 is advanced substantially concentrically with the approximately semicircularly shaped roll cup 41 by means of the cam 25, straddling with its upper and lower fork tines the band of batting 19. At this moment a rotatory movement of the winding mandrel is started by cam 3, so that the separated piece of batting is wound from its approximate middle. The guide 42 is articulated at 53 to the link 13b of upper conveyor 13 which is associated with the roll cup 41 and extends over the width of the batting as shown in FIG. 3. This guide is biased with an adjustable spring force in accordance with the consistency of the batting, and is limited in its excursion so that the desired outside diameter of the roll will be attained. For the guidance of the batting during the winding process, this guide arm 42 is provided with raised edges 42a. The tension jaws 37a, 37b, serve at this point mainly for exerting a certain tension on the one end of the piece of batting by deflecting the latter, so as to counteract the tension produced at the parting point during the winding process by the complete separation of the almost but not quite separated fibers.

Upon the completion of the winding process and the retraction of the winding mandrel, the roll 20, in the transport step that follows, continues at first to be held in the roll cup by the guide 42. As the conveyor chains continue their movement the guide is lifted off, so that the roll would lie free in the roll cup 41 and would drop out as it turns around the drive sprocket 12. In order to prevent this, in the present embodiment a curved lever 54 is articulated to the roll cup by a pin 205 and is pivoted, by means of a roller 55 encountering a cam 56, such that the free end of the lever, which has a curvature corresponding to the roll diameter, forms the roll cup into a more or less closed transport chamber, as represented in FIG. 4 at the roll 20 transfer station. At this station the roll is ejected by the plunger 35. Thereafter the roller 55 on lever 54 is released by the cam 56, whereupon the lever is pivoted, preferably by spring power, to the disengaged position.

The arrangement of the individual elements, as shown in FIG. 4, is such that the spacing of the roll cups and pairs of tension jaws corresponds to the length of the pieces that are to be pulled from the band of batting, and the distance between the axes of the conveyor chain sprockets is of the same order of magnitude. Thus, when a fully wound roll is ejected, another piece of batting is already in the winding apparatus. This eliminates waste motion. Accordingly, in this embodiment, the conveyor chains are provided with a total of four sets of the elements which are mounted on the chain links, as it can be seen in FIG. 4.

The apparatus described operates as follows.

During each advancing movement of the two conveyor chains 13-14, the length of batting 19 required for the roll 20 is pulled into the winding apparatus by means of the clamping jaws to which the ribbon of batting is delivered. Just before the intermittently advancing conveyor chains come to a stop the piece of batting is separated in the manner described above, the pairs of clamping jaws 39a-39b, 40a-40b, performing the task of holding the batting tightly while it is being pulled apart by the parting arm 50. For this purpose the individual jaws of these pairs are also especially designed: while jaw 40a has a projection 40e so as to form a support, clamping jaws 39a-39b are slightly chamfered so that the batting can be pulled apart in a desirable manner. After the conveyor chains come to a complete stop (FIG. 4), the slotted winding mandrel 18 straddles the batting held between the two strands of chain 13a-14a and twists it into a roll in the roll cup 41 which is in a position coaxial with the winding mandrel. In this situation the clamping jaws 40a-40b have already been released by the guiding rails 44 and 45. During the winding process the ribbon of batting is finally pulled apart in the area between the clamping jaw pairs 39a-39b and 40a-40b, the separated ends of the batting being featheredged by the pulling action, and this is important in preventing the wound roll from unwinding. At the same time the pair of tension jaws 37a-37b counteract the tension by deflecting the batting. After the completion of this action, which is controlled by the stepping cam 3, first the winding mandrel 18 and then the stripper 31 are retracted, whereupon stepping cam 3 and stepping wheel 6 initiate another advancement, during which the wound roll 20 is transported to the transfer station and another length of batting is pulled into the apparatus and separated, the length of the advancement corresponding to the length of batting required for making a roll. This situation will be the same as that represented in FIG. 4.

The described apparatus can be modified in various ways. For example, the intermittent driving of the conveyor chains and winding mandrel may be produced by a conventional Maltese cross drive or the like. Depending on the batting material used, the individual elements mounted on the chain links may be given a different form to achieve the described manner of operation. Lastly, if required, the batting or the roll may be provided with a removal ribbon in any suitable manner well known in the art, which for this reason is not indicated in the drawing.

What is claimed is:

1. In an apparatus for the automatic feed, separation and winding of a specific length of a fibrous batting for tampons and the like, comprising a rotatable winding mandrel, means for rotating said mandrel when it contains batting to form a wound roll, means for axially displacing said winding mandrel transversely of the direction of support of a delivered batting in the plane of transport of said batting, means for transporting said batting perpendicular to the transverse movement of said winding mandrel, means for separating pieces of batting of specific length, a plurality of confronting cam-controlled processing groups, each of which processing groups comprises a batting holding means and comprises at least one pair of batting clamping jaws each controlled by a cam for the pieces of said batting, said processing groups containing a cutting means, means for moving said cutting means transversely of the transport plane of the batting when the batting holding means is in engagement with the batting, the improvement which comprises at least two endless flexible members in facing relationship with one another, means for driving said flexible members synchronously stepwise in a common plane of circulation, one clockwise and the other counter clockwise, such as to form at least one working station in the region between said flexible members, said working station having a winding cap laterally disposed in said working station coaxially of said winding mandrel, means for moving said winding mandrel into said winding cup of said working station disposed between said flexible members, means for disposing a portion of one of said flexible members over a portion of the other flexible member to define said working station, said working station having a group of processing parts from each of said flexible members and comprising a pair of tension jaws, means for engaging said batting by said jaws, means for transferring a wound roll from said winding mandrel into said winding cup, means for engaging and holding said batting by said batting clamping jaws, said winding cup disposed between said tension jaws and said batting clamping jaws, said cutting means comprising a cutting lever pivotally mounted at said clamping jaws of one of the two flexible members, means for moving said cutting lever transversely to said batting, the length of each group of processing parts in the direction of circulation with respect to said flexible members corresponding to the length of the piece of batting to be pulled off and wound.

2. An improvement according to claim 1 wherein there are a plurality of winding cups, and at least two batting clamping jaws, each winding cup mounted to a flexible member, said apparatus including a guide in said winding cup over said batting articulated on the opposite endless flexible member and means for extending said guide over the width of said batting during winding by said winding mandrel to retain the desired outside diameter of the roll so formed.

3. An improvement according to claim 2 wherein said apparatus further comprises a cam, a roller and a curved lever, means for articulating said curved lever to said winding cup, said curved lever pivotally connected to said roller, said roller bearing on said cam whereby said lever is caused to be disposed over said winding cup to provide a substantially closed transport chamber.

4. An improvement according to claim 3 wherein said cam on which said roller bears has a ramp surface and in the region of said ramp surface of said cam there is an ejection means and said apparatus further comprises means for displacing said ejector means transversely of the direction of advancement of the batting to eject a wound roll transversely.

5. An improvement according to claim 4 wherein said ejection means is a plunger.

6. An improvement according to claim 4 wherein said tension jaws are disposed on the respective flexible members so as to be offset from the corresponding cooperating tension jaw member on the other flexible member in such a manner that in the engagement position they effect a deflection of the batting.

7. An improvement according to claim 6 wherein said spring biased guide has edges which laterally overlap batting feed through said apparatus and said tension jaws have engaging surfaces with edges which laterally overlap batting fed through said apparatus.

8. An improvement according to claim 7 wherein said apparatus further comprises a transmission gear and a pair of stepping wheels located outside one another and offset 180° from one another, said stepping wheels having planes of rotation parallel to one another, said apparatus further comprising a stepping cam disposed between and connected to said stepping wheels, said cam having a plane of rotation perpendicular to the planes of rotation of said stepping wheels and means for driving said cam whereby to actuate said stepping wheels, said winding mandrel connected to one of said stepping wheels through said transmission gear.

9. An improvement according to claim 8 wherein said stepping cam is in engagement with a roller mounted on each of said stepping wheels through which the stepping wheels are alternatively rotatable.

10. An improvement according to claim 8 wherein at least one of said flexible members comprises a conveyor chain having drive sockets engaged by one of said stepping wheels through a gear drive, a counter shaft transmission connecting the other of said stepping wheels to said winding mandrel.

11. An apparatus according to claim 7 wherein said apparatus comprises a stepping cam, a drive shaft and means for driving said drive shaft, said stepping cam is co-rotationally mounted on said drive shaft and disposed parallel to the direction of movement of said batting, said apparatus further comprises a second cam, said second cam mounted co-rotationally on said drive shaft and connected to said winding mandrel, said apparatus comprises a third cam, said third cam is mounted co-rotationally on said drive shaft, said apparatus comprises means for stripping a wound roll from said winding mandrel, said third cam is connected to said means for stripping a wound roll from said winding mandrel, said apparatus comprises a fourth cam, said fourth cam mounted on said drive shaft, said apparatus comprises a crank drive, said fourth cam connected to said crank drive, said ejection means connected to said crank drive whereby rotation of said drive shaft actuates said crank drive which in turn moves said ejection means transversely to the direction of travel of said batting through said apparatus.

* * * * *